United States Patent [19]

Mizukami et al.

[11] Patent Number: 5,369,331
[45] Date of Patent: Nov. 29, 1994

[54] PIGMENT-ATTACHED BLUE-EMITTING PHOSPHOR AND COLOR CATHODE-RAY TUBE

[75] Inventors: Tomohito Mizukami; Chihito Funayama, both of Odawara; Yasuo Oguri, Tokyo, all of Japan

[73] Assignee: Kasei Optonix, Ltd., Tokyo, Japan

[21] Appl. No.: 969,837

[22] PCT Filed: Jun. 19, 1992

[86] PCT No.: PCT/JP92/00785

§ 371 Date: Feb. 3, 1993

§ 102(e) Date: Feb. 3, 1993

[87] PCT Pub. No.: WO 93/00413

PCT Pub. Date: Jan. 7, 1993

[30] Foreign Application Priority Data

Jun. 20, 1991 [JP] Japan .................................. 3-148636

[51] Int. Cl.$^5$ ............................................. C09K 11/02
[52] U.S. Cl. ..................... 313/467; 106/426; 106/480; 106/481; 252/301.4 R; 252/301.4 F; 252/301.4 H; 252/301.4 S; 252/301.5; 252/301.6 F; 252/301.6 S; 427/64; 427/68; 427/219; 428/404
[58] Field of Search ................. 252/301.4 R, 301.4 F, 252/301.4 H, 301.4 S, 301.5, 301.6 F, 301.6 S; 106/426, 480, 481; 427/64, 68, 219; 428/404; 313/467

[56] References Cited

U.S. PATENT DOCUMENTS

| | | |
|---|---|---|
| 3,483,416 | 12/1969 | Vermeulen ........................... 313/467 |
| 3,886,394 | 5/1975 | Lipp . |
| 4,544,605 | 10/1985 | Miyazaki et al. ................... 428/404 |
| 4,690,832 | 9/1987 | Yale ............................... 252/301.6 F |

FOREIGN PATENT DOCUMENTS

| | | | |
|---|---|---|---|
| 1479038 | 8/1974 | United Kingdom . | |
| 405840 | 3/1974 | U.S.S.R. | ............................... 106/426 |
| 1011574 | 4/1983 | U.S.S.R. | ............................... 106/426 |

*Primary Examiner*—Jack Cooper
*Attorney, Agent, or Firm*—Oblon, Spivak, McClelland, Maier & Neustadt

[57] ABSTRACT

The present invention provides a pigment-attached blue-emitting phosphor having attached a blue pigment which has fastness and chemical stability and is excellent in reflection spectrum characteristics, and a color cathode-ray tube having a blue-emitting fluorescent layer containing the blue pigment formed on the inner surface of a face plate.

The present invention also provides a pigment-attached blue-emitting phosphor having a $CoO \cdot ZnO \cdot SiO_2$ type blue pigment attached thereto, and a color cathode-ray tube provided with a blue-emitting fluorescent layer containing the blue pigment particles on the inner surface of a face plate.

10 Claims, 8 Drawing Sheets

PIGMENT-ATTACHED BLUE-EMITTING PHOSPHOR AND COLOR CATHODE-RAY TUBE

TECHNICAL FIELD

The present invention relates to a pigment-attached blue-emitting phosphor suitable for a fluorescent layer of a color cathode-ray tube, etc., and a color cathode-ray tube provided with a blue-emitting fluorescent layer containing blue pigment particles on the inner surface of a face plate.

BACKGROUND TECHNIQUE

To improve the contrast of images of color cathode-ray tubes, fluorescent display tubes, etc., there have been known a method which employs a pigment-attached phosphor wherein filter particles capable of absorbing the reflection of an exterior light at a fluorescent screen, are attached to the phosphor surface (U.S. Pat. No. 3,886,394 and U.S. Pat. No. 4,307,320), and a method which employs colored glass as the face plate of a cathode-ray tube.

In the method which employs colored glass as the face plate of a cathode-ray tube, the transmittance of glass is reduced, whereby the contrast can be selected relatively readily within a practical range, but, the absorption of not only the exterior light but also the emission from the fluorescent layer increases, whereby the reduction of brightness is substantial.

Further, the method which employs the pigment-attached phosphor as the fluorescent layer is a method effective for improving the contrast without reducing the brightness of a screen as far as possible.

The above filter material is used sometimes for sharpening the emission spectrum of a phosphor. This filter material is required to have a transmittance high in the emission wavelength region of the phosphor and low in other wavelength regions. By this characteristic of the transmittance, light components which do not correspond to the emission of the phosphor itself will be absorbed, whereby the contrast under a bright exterior light can be improved.

With respect to the blue-emitting phosphor, it is suitable to use a pigment which has an absorption as small as possible at about 450 nm which is the emission peak of the phosphor, and an absorption as large as possible within the other wavelength regions.

As this sort of a blue pigment, there have been proposed ultramarine ($3NaAl.SiO_2.Na_2S_2$), prussian blue ($Fe_4[Fe(CN)_6]_3.nH_2O$), cobalt aluminate ($CoO.nAl_2O_3$), cerulean blue ($CoO.nSnO_2$), copper sulfide (CuS), etc. in Japanese Unexamined Patent Publication No. 28784/1979.

However, from researches of the present inventors, it has been found that the body color of cobalt aluminate usually practiced does not correspond to the emission spectrum of the blue-emitting phosphor. The reflectance of the cobalt aluminate is especially high at around 490 nm, such being ineffective to improve the contrast.

Further, the ultramarine practically used to some extent has excellent properties as compared with the cobalt aluminate, but its chemical stability is very poor, whereby a problem of fading in the attaching step to the phosphor or in the coating step to the cathode-ray tube is brought about.

To prevent the fading, it has been known to employ a method wherein the ultramarine pigment is covered with a silicic compound. However, when it is coated on a cathode-ray tube, there is a problem that its body color is remarkably changed by irradiation of electron beam, whereby a shift of the peak in the emission spectrum of the fluorescent screen is likely to occur.

Under these circumstances, it is intended in the present invention to solve the above problems and to provide a pigment-attached blue-emitting phosphor comprising a blue-emitting phosphor having a blue pigment attached thereto, which has fastness and chemical stability and is excellent in reflection spectrum characteristics, whereby good blue emission can be obtained when coated on the cathode-ray tube, and a color cathode-ray tube provided with a blue-emitting layer containing the above blue pigment on the inner surface of the face plate.

DISCLOSURE OF THE INVENTION

The present invention provides a pigment-attached blue-emitting phosphor comprising a blue-emitting phosphor and a blue pigment attached to the surface of the blue-emitting phosphor, said blue pigment being a $CoO.ZnO.SiO_2$ type pigment, and a color cathode-ray tube comprising a face plate having a blue-emitting fluorescent layer containing blue pigment particles on the inner surface of the face plate, wherein a $CoO.ZnO.SiO_2$ type pigment is used as the blue pigment particles.

The $CoO.ZnO.SiO_2$ type pigment has been known mainly as a glaze stains for coloring potteries. However, in general, such a material has not been used alone as a pigment, etc., and only the ones having a particle diameter of from 5 to 10 μm are usually available as the glaze stains. Thus, its use has not been studied at all in the field of the pigment-attached phosphor wherein a pigment particle size of about 1 μm or less is required.

Here, the $CoO.ZnO.SiO_2$ type pigment is the one obtained by firing a material containing Co, Zn and Si usually at a temperature of not less than 1,000° C. for several tens minutes to several tens hours, followed by cooling and pulverizing. This pigment includes a mixture of oxides of the respective elements or a composite oxide thereof, a mixture of cobalt silicate and zinc silicate or a solid solution of the both, and a mixture thereof. The compositional ratio of the $xCoO.yZnO.zSiO_2$ type pigment is preferably within ranges of $0.05 \leq x/z \leq 1.5$ and $0.1 \leq y/z \leq 2.0$, particularly preferably ranges of $0.2 \leq x/z \leq 1.0$ and $0.3 \leq y/z = 1.7$. If the ratio is outside the ranges, color tone will be changed, such being not suitable for the blue pigment to be combined with the blue-emitting phosphor. This composite oxide includes a mixture of oxides of the respective elements or double oxides thereof, a mixture of cobalt silicate and zinc silicate or a solid solution thereof, and a mixture thereof.

It is possible to incorporate various fluxes and other elements upon sintering the above pigment if necessary. More specifically, it is possible to incorporate Li, Na, K, Ca, Mg, Ba, Fe, Ni, Cu, Mn, Ti, V, Al, Sn, Sb, Cr, Pr, etc. These elements may be added within the range of not more than about 10% by weight. If the amount exceeds this limit, it becomes impossible to obtain desirable color tone as the blue pigment.

Further, synthesis method of a blue pigment is not particularly restricted. However, synthesis can be conducted by, for example, the following methods:

(1) Dry mixing and firing method

A method wherein the pigment is obtained by formulating raw materials containing Co, Zn and Si at a predetermined ratio, mixing them by a ball mill, and firing the mixture at a temperature of from about 1,000° C. to 1,300° C. for several tens minutes to several tens hours, followed by cooling and pulverizing, and classification.

(2) Co-precipitation method

A method wherein the pigment is obtained by adding an alkaline aqueous solution to an aqueous solution containing cobalt and zinc to co-precipitate cobalt and zinc as hydroxides, replacing water with an organic solvent, and having a silicone oxide deposited on the surface of the precipitation by hydrolysis, followed by firing.

Here, as the cobalt and zinc compounds to be used for the preparation of the aqueous solution, chlorides, fluorides, iodides, bromides, sulfates, nitrates and the like may be used. As the organic solvent for the replacement of water, ethanol, methanol and the like may be used. As the silicon raw material, alkoxide silicate and the like may be used. The firing temperature is usually within the range of from about 700° to 1,000° C. in air.

(3) Co-precipitation/dry mixing and firing method

A method wherein the pigment is obtained by adding to an aqueous solution containing cobalt and zinc, an organic compound as a precipitating agent, capable of being dissolved in water and forming a water-hardly soluble or water-insoluble substance by reacting with cobalt and zinc, to co-precipitate cobalt and zinc, followed by drying, mixing with silicon oxide, and firing.

The aqueous solution containing cobalt and zinc to be used, is similar to the one used in the above co-precipitation method. As the precipitating agent, it is preferred to use an organic compound capable of being dissolved itself in water and forming a water-hardly soluble or water-insoluble substance by reacting with cobalt and zinc, for example, oxalic acid or tartaric acid. As the silicon oxide, it is preferred to use an anhydrous ultrafine particles having a specific surface area of not less than 100 m$^2$/g which is further excellent in the reactivity. The firing temperature is usually within the range of from 800° to 1,100° C. Particularly, the above co-precipitation method and co-precipitation/dry mixing and firing method are novel production methods, whereby the ones having a smaller particle size than the pigment obtained by the conventional dry mixing and firing method, and more suitable ones in viewpoints of color, attaching force and the like as the pigment for the pigment-attached phosphor, can be produced readily.

The blue-emitting phosphor useful for the present invention includes the ones having a main part of the emission spectrum within the range of from 380 to 500 nm, more specifically, a silver-activated zinc sulfide type phosphor [ZnS:Ag, X (X is halogen or Al), ZnS:Ag,M,X (M is Ga, In, etc., and X is halogen or Al)], Y$_2$SiO$_5$:Ce, Ca$_2$B$_5$O$_9$Cl:Eu, (Ba$_x$Mg$_{1-x}$)O.nAl$_2$O$_3$:Eu (0≦x≦1, 7≦n≦8), SrSi$_3$O$_8$Cl$_4$:Eu, CaWO$_4$, CaWO$_4$:Pb, BaFCl:Eu, Gd$_2$O$_2$S:Tb, ZnS:Zn, etc.

The attached amount of the above blue pigment to the blue-emitting phosphor is preferably within the range of from 0.3 to 30 wt %. If the attached amount is below the lower limit, the filter effect tends to be too small, and if it exceeds the upper limit, the luminescence brightness tends to be insufficient.

The present inventors have studied various pigments which have body colors corresponding to the emission spectrum of the blue-emitting phosphor, and hardly undergo deterioration or fading upon irradiation of electron beam for a long period of time in vacuum when used for a fluorescent layer of a cathode-ray tube. As a result, they have found that the above CoO.ZnO.SiO$_2$ type blue pigment satisfies the above requirements. They have also found it possible to obtain a fluorescent screen of a high contrast while maintaining the brightness and to provide a color cathode-ray tube which is easily seen under a bright exterior light, by using a face plate coated with a pigment-attached blue-emitting phosphor having the blue pigment attached thereto, or a face plate provided with a blue-emitting fluorescent layer containing blue pigment particles wherein a pigment layer is coated between the face plate and the blue-emitting fluorescent layer.

By employing the above construction in the present invention, it is possible to have attached, to a blue-emitting phosphor, a blue pigment having a diffuse reflectance corresponding to the emission spectrum of the blue-emitting phosphor and being excellent in fastness and chemical stability. It is also possible to provide an excellent blue-emitting phosphor which undergoes no deterioration or a color shift in the attaching step or in the coating step, or in the use for a cathode-ray tube. Further, by providing the above blue pigment layer between the face plate and the blue-emitting fluorescent layer, a fluorescent screen of a high contrast can be obtained while maintaining the brightness, and as a result, it becomes possible to provide a color cathode-ray tube having a screen which is easily seen under bright lighting.

BEST MODE FOR CARRYING OUT THE INVENTION

Figure 1:
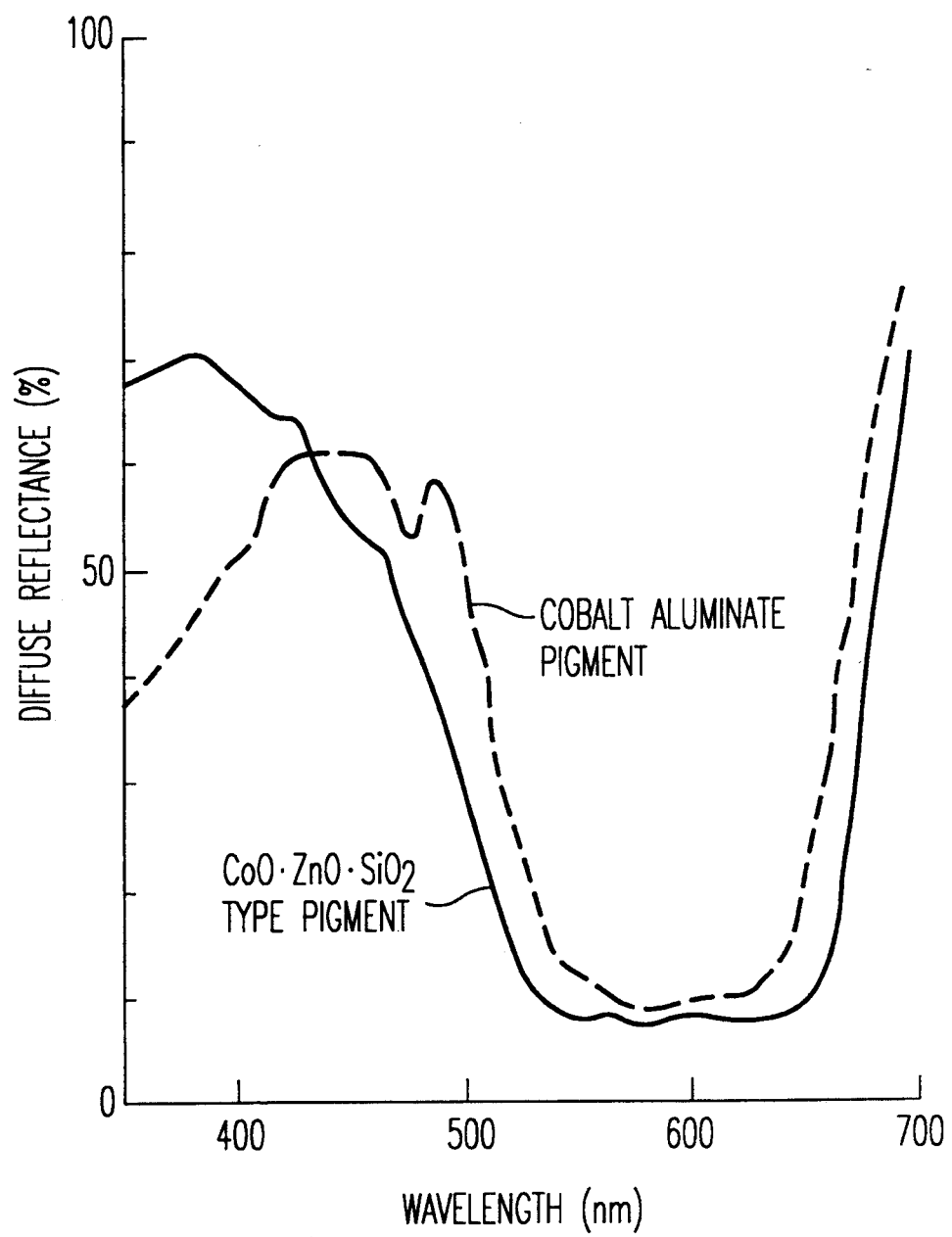
FIG. 1 is a graph showing diffuse reflectance spectrums of a cobalt aluminate pigment and a CoO.ZnO.SiO$_2$ type pigment.
Figure 2:
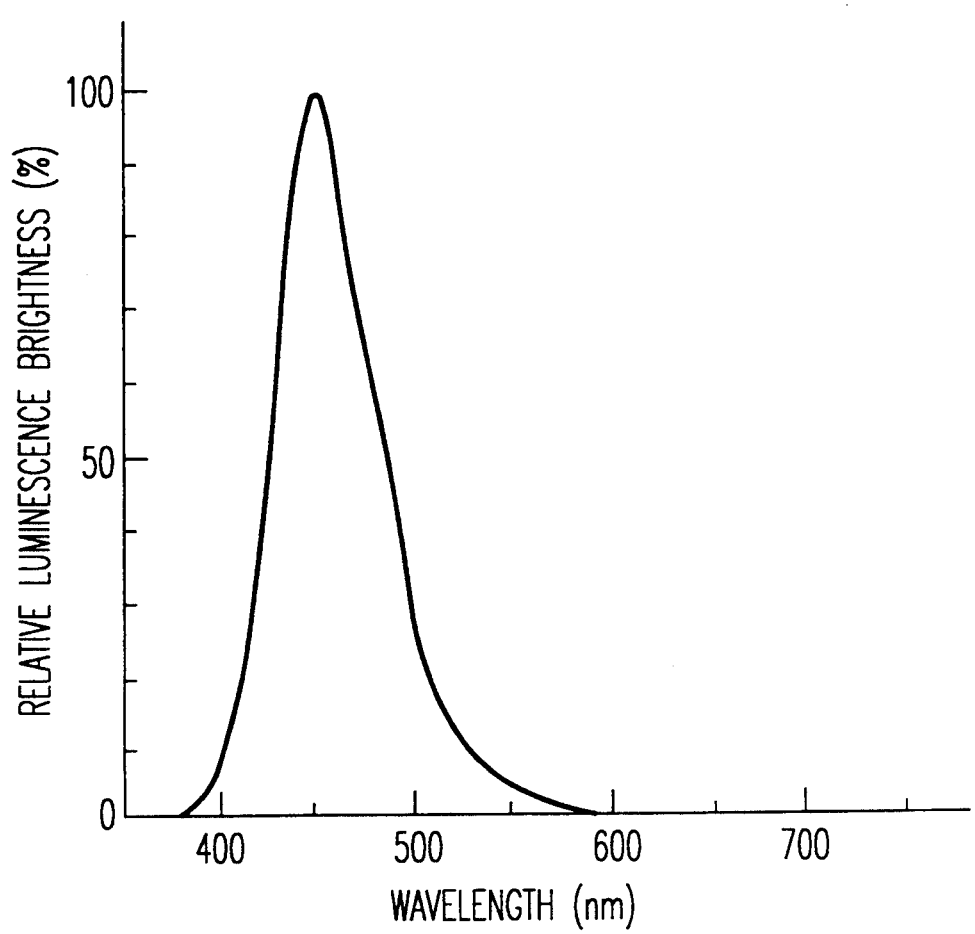
FIG. 2 is a graph showing an emission spectrum of a ZnS:Ag,Cl phosphor which is a typical blue-emitting phosphor.

FIG. 1 is a graph comparing the diffuse reflectance spectrums of a xCoO.yZnO.zSiO$_2$ type pigment (x=0.36, y =0.6 and z=1.0) and a cobalt aluminate pigment. FIG. 2 is a graph showing the emission spectrum of the ZnS:Ag,Cl phosphor which is a typical blue-emitting phosphor.

As is apparent from the comparison between FIG. 1 and FIG. 2, the emission spectrum of the phosphor and the diffuse reflectance of the pigment i.e. the body color, are corresponding to each other with respect to the $xCoO.yZnO.zSiO_2$ type pigment rather than the cobalt aluminate pigment. Further, the cobalt aluminate pigment has a specific peak at about 490 nm, but the $xCoO.yZnO.zSiO_2$ type pigment has no such a specific peak, whereby its filter effect at 480 to 520 nm is excellent as compared with the cobalt aluminate pigment.

Figure 3:
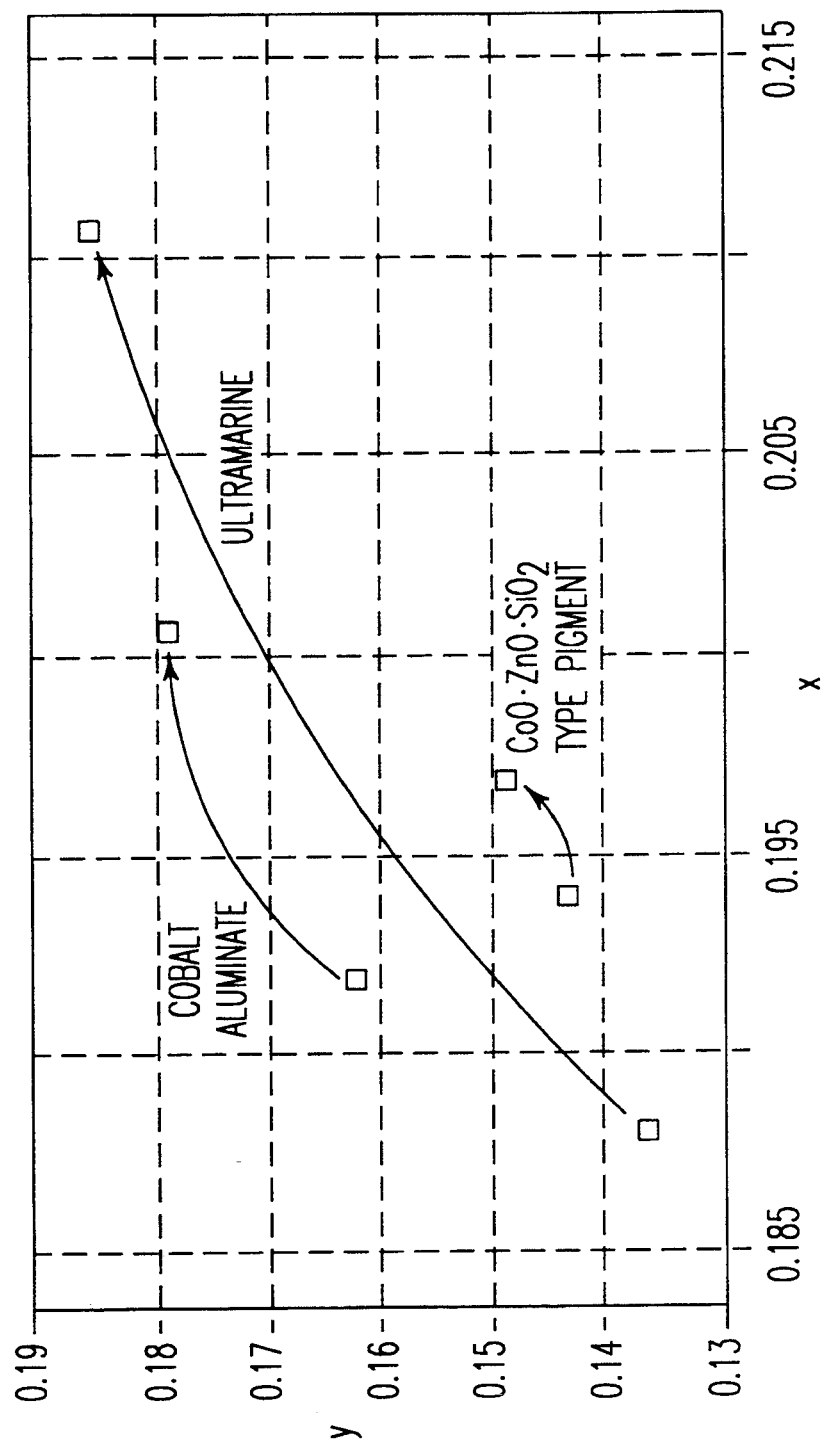
FIG. 3 is a graph showing a color shift upon irradiation of electron beam on an ultramarine, a cobalt aluminate pigment or a CoO.ZnO.SiO$_2$ type pigment by x and y values of a CIE system.

FIG. 3 shows the deterioration upon irradiation of electron beam, namely the change of the body color upon irradiation of electron beam of an intensity of 20 KV and 30 $\mu A/cm^2$ for 30 minutes on a metallic plate having the $xCoO.yZnO.zSiO_2$ type pigment, a cobalt aluminate pigment or an ultramarine coated thereto, by the x and y values of the CIE system. As is apparent from FIG. 3, the body colors are substantially changed in the order of the ultramarine and the cobalt aluminate pigment, but the $xCoO.yZnO.zSiO_2$ type pigment hardly shows a change and thus is excellent in fastness and chemical stability. This means that the body color and the emission color undergo no change even when used for the cathode-ray tube and the like for a long period of time, such being extremely useful in a practical use.

Particularly, taking into consideration the deterioration due to the excitation energy by electron beam or the like, extremely stable contrast and emission color can be shown by a color cathode-ray tube having as fluorescent screens, respective blue-, red- and green-fluorescent layers obtained by combining the pigment-attached blue-emitting phosphor of the present invention, $Y_2O_2S:Eu$ or a $Y_2O_3:Eu$ red-emitting phosphor having a red pigment of red iron oxide attached thereto, and a ZnS:Cu,Al green-emitting phosphor or a ZnS:Cu,Al green-emitting phosphor having a $TiO_2.ZnO.CoO.NiO$ type green pigment attached thereto, such being useful.

Figure 7:
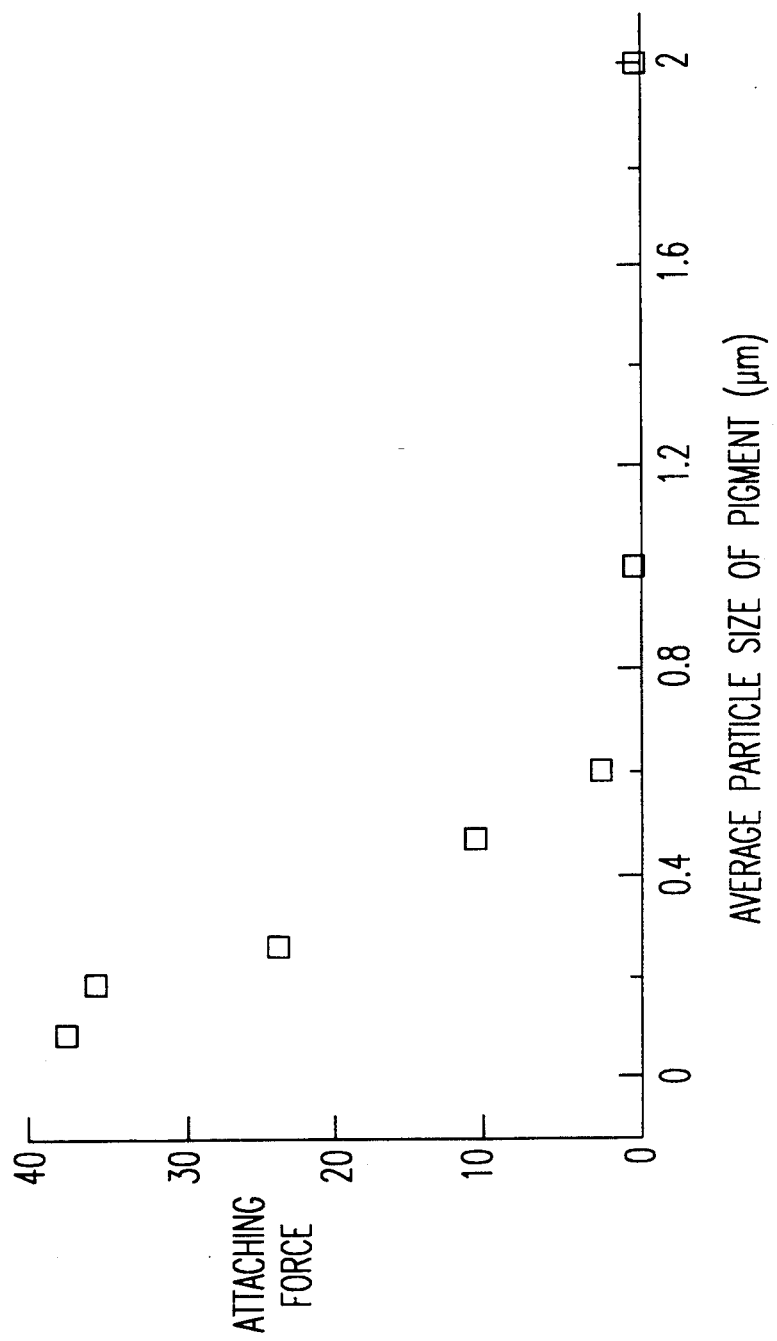
FIG. 7 is a graph showing the relationship between an average particle size and an attaching force of a blue pigment.

The present inventors have studied the relationship between the average particle size and the attaching force with respect to the $CoO.ZnO.SiO_2$ type blue pigment, and found the relationship as shown in FIG. 7. Here, the attaching force is obtained by shaking and mixing a pigment-attached phosphor in water added with 0.1% of a surfactant, leaving it to stand for 2 hours, and measuring the transmittance of the supernatant at 600 nm. If the numerical value is small, the pigment exfoliates in water, whereby the transmittance will be reduced, such showing that the attaching force of the pigment is low. As is apparent from FIG. 7, if the average particle size of this pigment exceeds 0.5 $\mu m$, the attaching force is low, and thus the average particle size is preferably not more than 0.5 $\mu m$ from the practical viewpoint.

Further, taking the relationship with especially the color development of this pigment into consideration, the average particle size is preferably within the range of from 0.1 to 0.45 $\mu m$.

Figure 8:
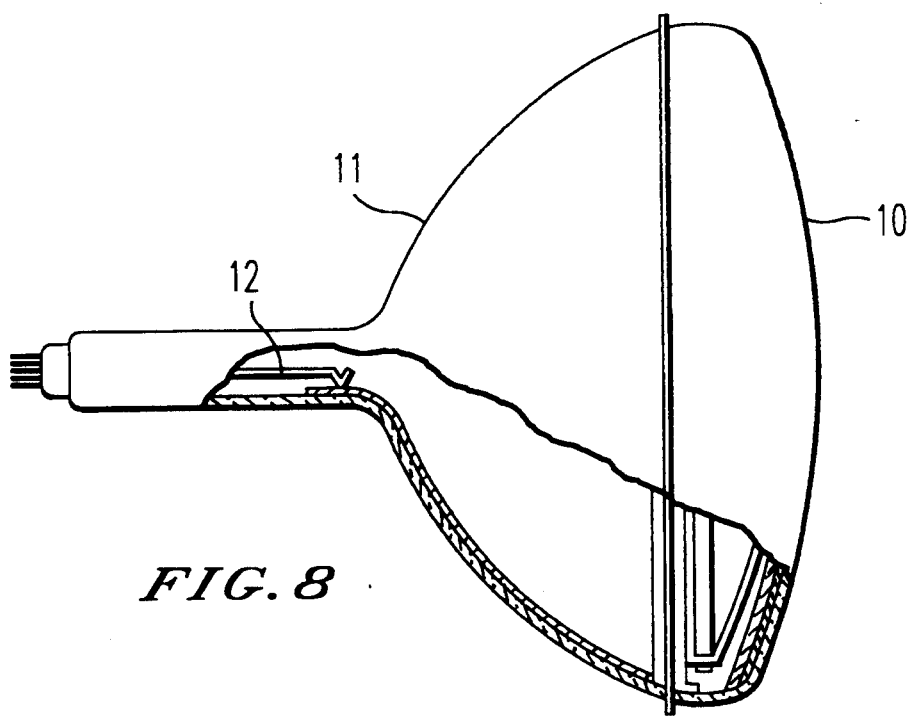
FIG. 8 is a partially cutaway side view of a color cathode-ray tube which is a specific example of the present invention.
Figure 9:
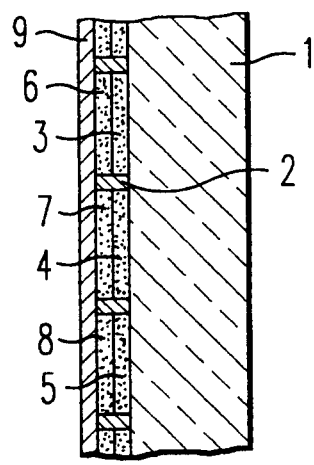
FIG. 9 is an enlarged sectional view of a main part of the fluorescent screen of FIG. 8.

FIG. 8 is a partially cutaway side view of the color cathode-ray tube of the present invention. FIG. 9 is an enlarged sectional view of a main part of the fluorescent screen of FIG. 8. The formation of a pigment layer on the face plate is carried out by a photolithography technique like the formation of the fluorescent layer. First, a first pigment slurry, for example, a slurry composed of a mixture of a green pigment and a photosensitive binder such as ammonium dichromate (hereinafter referred to as ADC) and polyvinyl alcohol (hereinafter referred to as PVA), is coated on the inner surface of a face plate 1 previously having a black matrix 2 formed thereon, and dried to form a layer. This layer is exposed to a light through a shadow mask, and developed to form a green pigment layer 3 into a predetermined pattern. Then, a second pigment slurry, for example, a blue pigment slurry composed of a mixture of a blue pigment and a photosensitive binder, is used to form a blue pigment layer 4 into a predetermined pattern in the same manner as in the above at a position other than the above green pigment layer 3. Further, a third pigment slurry, for example, a red pigment slurry is used to form a red pigment layer 5 into a predetermined pattern in the same manner as in the above at a position other than the green pigment layer 3 and the blue pigment layer 4.

Then, a green phosphor, a blue phosphor and a red phosphor are coated on the pigment layers of each color by a photolithography technique to form a green phosphor picture element 6, a blue phosphor picture element 7 and a red phosphor picture element 8. Further, an aluminium layer is vapor deposited thereon to form a metal back 9, whereby a fluorescent screen is completed on the face plate 1. A panel 10 provided with this face plate 1 is sealed with a funnel 11, and an electron gun 12 is mounted thereon to complete a color cathode-ray tube.

EXAMPLE 1

1.7 parts of cobalt oxide, 2.6 parts of zinc oxide and 5.8 parts of silicon oxide were mixed by a dry system, and sintered at 1,300° C. in air for 2 hours, followed by pulverization and classification to obtain a $xCoO.yZnO.zSiO_2$ type pigment (x=0.36, y=0.6 and z=1.0) having an average particle size of 1.7 $\mu m$.

100 parts of distilled water was added to 100 parts of a silver-activated zinc sulfide blue-emitting phosphor to obtain a slurry, and 1 part of the above $xCoO.yZnO.zSiO_2$ type pigment (x=0.36, y=0.6 and z=1.0) was added thereto. An aqueous solution of 0.36 part of gelatin and 0.3 part of gum arabic as binders was added thereto while heating to 45° C., and pH was adjusted to 4.1 by acetic acid. The mixture was left to cool to room temperature, and then 7.5 parts of a 50% glutaraldehyde aqueous solution was added to cure the binder.

Pigment-attached phosphors of Examples were prepared by having the pigment attached in the same manner except that the attached amount of the pigment was changed to 3 parts, 5 parts or 7 parts.

Further, for comparison, pigment-attached phosphors of Comparative Examples were obtained by attaching in the same manner as in the above Examples except that the cobalt aluminate pigment was used instead of the above pigment in an amount of 1 part, 3 parts, 5 parts or 7 parts.

Figure 4:
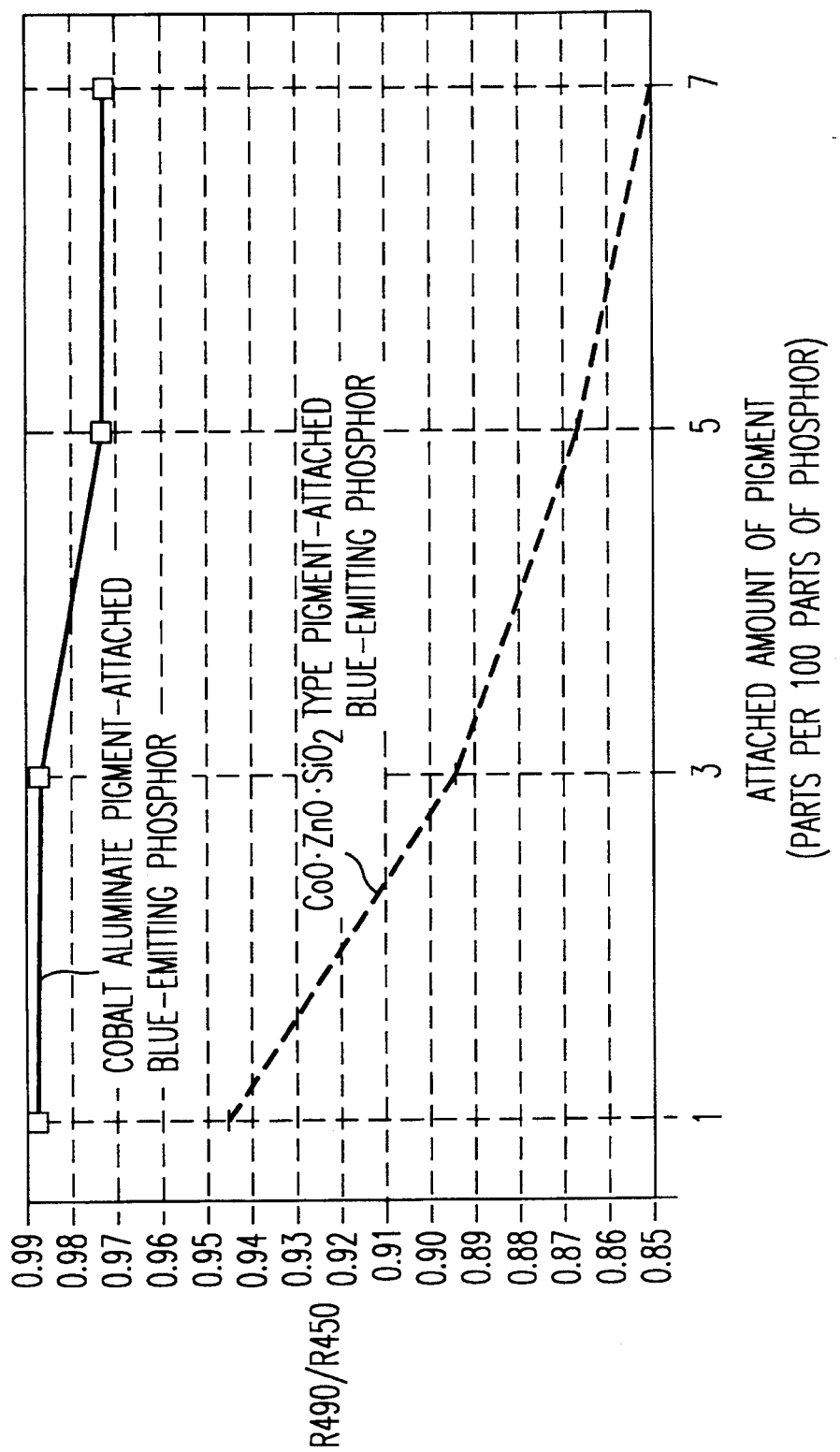
FIG. 4 is a graph showing a ratio $R_{490}/R_{450}$ of peaks of diffuse reflectance spectrums at 490 nm and 450 nm with respect to blue-emitting phosphors each having a cobalt aluminate pigment or a CoO.ZnO.SiO$_2$ type pigment attached thereto.

FIG. 4 is a graph obtained by measuring diffuse reflectances at 490 nm and 450 nm with respect to 8 kinds of pigment-attached phosphors of two types of the above Examples and Comparative Examples, and plotting a (reflectance at 490 nm)/(reflectance at 450 nm) as an ordinate and the attached amount of the pigment as an abscissa. As is apparent from FIG. 4, the pigment-attached phosphors of Examples show smaller values and thus have larger filter effects than those of Comparative Examples.

Figure 5:
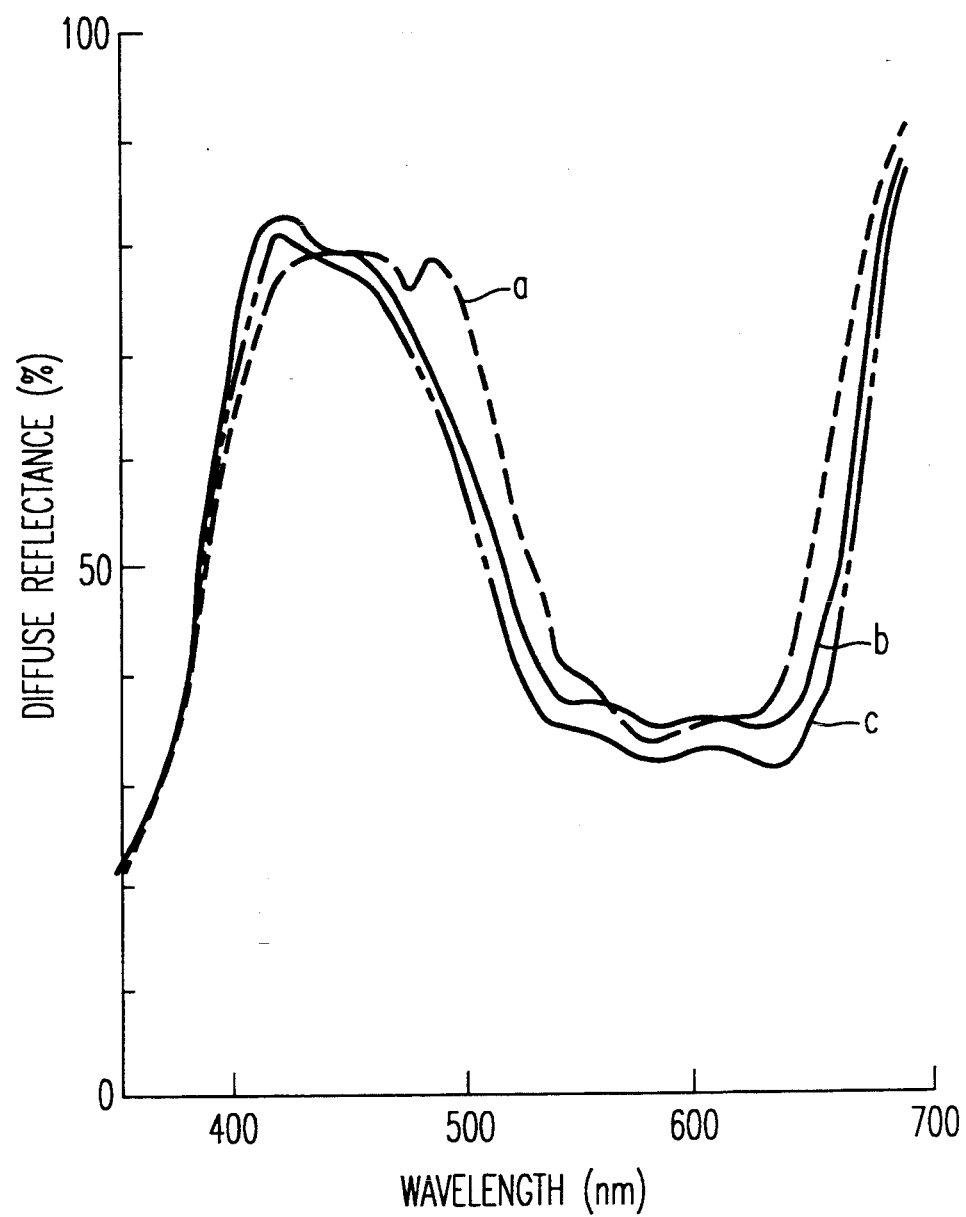
FIGS. 5 and 6 are graphs showing diffuse reflectance distributions of blue-emitting phosphors each having a cobalt aluminate pigment or a CoO.ZnO.SiO$_2$ type pigment attached thereto.

FIG. 5 is a graph comparing the diffuse reflectance distributions with respect to the phosphor attached with 7 parts of the pigment in the above Examples (curve b)

and the phosphor attached with 3 parts of the pigment in the above Comparative Examples (curve a). As is apparent from FIG. 5, the phosphor of the Comparative Example shows a peak at around 490 nm, but the phosphor of the Example has no such a peak and corresponds well to the emission spectrum of the phosphor.

EXAMPLE 2

A blue pigment layer having an average thickness of 1 μm was formed on the inner surface of a face plate by a photolithography method by using a pigment slurry of a formulation of 5 weight % of a $xCoO.yZnO.zSiO_2$ composite oxide (x=1.0, y=1.0 and z=1.0) as a blue pigment produced by a dry mixing and firing method, 2 weight % of PVA (degree of polymerization: 2,400, degree of saponification: 88%), 0.15 weight % of sodium dichromate (Kanto Kagaku K. K.), 0.03 weight % of a surfactant and water as a residue.

Then, a blue phosphor picture element was formed on the blue pigment layer by a conventional method by using ZnS:Ag,Cl as a blue-emitting phosphor.

For comparison, fluorescent screens were formed in the same manner as in the above Example by coating cobalt aluminate or ultramarine instead of the above blue pigment to the same thickness as the above Example.

Comparison of Brightness and Contrast

The brightness and contrast of each fluorescent screen of the above Example and Comparative Examples were measured to obtain the results as shown in Table 1. The values of the contrast are shown as a ratio of the brightness at highlight parts (white-emitting parts under mounted condition) and the brightness at shadow parts (non-emitting parts under mounted condition) when the face plate surface was irradiated with an exterior light. As is apparent from Table 1, the fluorescent screen of the Example shows that the reduction of white luminance was small as compared with two Comparative Examples, and that high contrast was maintained.

TABLE 1

|  | Pigment | White luminance | Contrast |
| --- | --- | --- | --- |
| Example 2 | CoZn—Si type composite oxide | 95 | 125 |
| Comparative Example 1 | Cobalt aluminate | 86 | 115 |
| Comparative Example 2 | Ultramarine | 89 | 125 |
| Comparative Example 3 | No pigment | 100 | 100 |

EXAMPLE 3

4.7 parts of cobalt chloride (hexahydrate) and 5.5 parts of zinc chloride were dissolved in 100 parts of deionized water. 1N sodium hydroxide aqueous solution was gradually added under stirring to adjust the pH to 9. The mixture was left to stand still, the supernatant was removed, and the same volume of ethanol was added. The mixture was left to stand still again, and the supernatant was replaced with ethanol. 24 parts of a 28% aqueous ammonia was added thereto. Further, a solution of 20 parts of tetraethoxysilane dissolved in 20 parts of ethanol, was added and the mixture was heated to 40° C. and maintained for 2 hours under stirring. After completion of the reaction, a solid product obtained by centrifugal separation was subjected to air-drying to remove ethanol, and fired at 800° C. for 2 hours to obtain a $xCoO.yZnO.zSiO_2$ pigment (x=0.3, y=0.6 and z=1.0) having an average particle size of 0.3 μm.

Then, 100 parts of distilled water was added to 100 parts of a silver-activated zinc sulfide blue-emitting phosphor to obtain a slurry. 7 parts of the above blue pigment was added thereto, and an aqueous solution of 0.36 part of gelatin and 0.3 part of gum arabic as binders was added thereto while heating to 45° C., the pH was adjusted to 4.1 by acetic acid, and the mixture was left to cool to room temperature. Then, 7.5 parts of a 50% glutaraldehyde aqueous solution was added thereto to cure the binder.

Comparison of Filter Effects

The diffuse reflectance of the pigment-attached phosphor obtained in Example 3 was measured and the results are shown in FIG. 5 as curve c. The phosphor in Example 3 having attached the pigment of small particles shows lower reflectance at around 600 nm and excellent filter effect as compared with the phosphor of Example 1 (curve b in FIG. 5), although the attached amounts of the pigments are the same in these Examples.

EXAMPLE 4

Preparation Example of Blue Pigment 32 parts of cobalt chloride (hexahydrate) and 22.3 parts of zinc chloride were dissolved in 500 parts of deionized water. Separately, 40 parts of oxalic acid (dihydrate) was dissolved in 500 parts of a deionized water. Then, the oxalic acid aqueous solution was added to the metallic salt aqueous solution under stirring. Further, stirring was continued for 15 minutes, and the mixture was left to stand still for about 1 hour, and then the supernatant was removed, followed by drying at 90° C. After drying, the product was mixed with 9.67 parts of silicon oxide having a specific surface area of 200 m²/g in a dry system, and the mixture was fired at 1,000° C. for 1 hour and pulverized to obtain a $xCoO.yZnO.zSiO_2$ type blue pigment (x=0.8, y=1.0 and z =1.0) having an average particle size of 0.14 μm.

Preparation Example of Blue Pigment-Attached Blue-Emitting Phosphor 100 parts of distilled water was added to 100 parts of a silver-activated zinc sulfide blue-emitting phosphor to obtain a slurry. 3 parts of the above blue pigment was added thereto, and an aqueous solution of 0.36 part of gelatin and 0.3 part of gum arabic as binders was added while heating to 45° C. The pH was adjusted to 4.1 by acetic acid and the mixture was left to cool to room temperature. Then, 7.5 parts of a 50% glutaraldehyde aqueous solution was added to cure the binder.

EXAMPLE 5

60 parts of cobalt oxide, 103 parts of zinc oxide and 64 parts of silicon oxide were mixed in a dry system, and the mixture was fired at 1,300° C. in air for 2 hours and pulverized to obtain a $xCoO.yZnO.zSiO_2$ pigment (x=0.8, y=1.3 and z=1.0) having an average particle size of 0.64 μm.

This blue pigment was attached to a silver-activated zinc sulfide blue-emitting phosphor under the same conditions as in Example 4.

Comparison of Filter Effects

Figure 6:
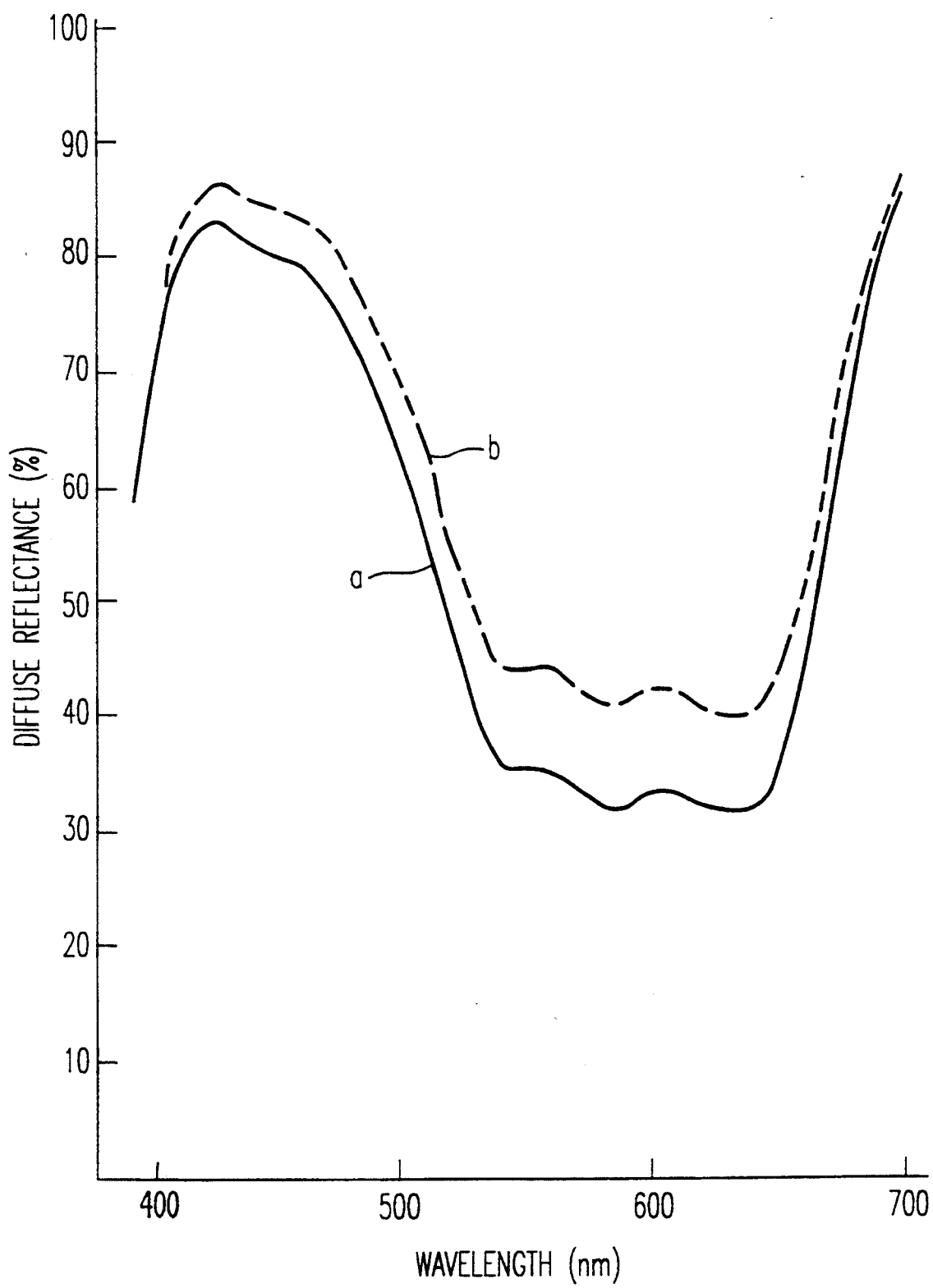

The diffuse reflectances of the pigment-attached phosphors obtained in Example 4 and Example 5 were measured, and the results are shown by a and b in FIG. 6. The phosphor of the Example wherein the pigment of smaller particles was attached, shows lower reflectance at around 600 nm and superior filter effect, although the attached amounts of the pigments were the same in these Examples.

We claim:

1. A pigment-attached, blue-emitting phosphor, comprising:
   a blue-emitting phosphor and a blue pigment attached to the surface of the blue-emitting phosphor, in an amount of 0.3 to 30 wt. %, said blue pigment having the formula:

$$xCoO \cdot yZnO \cdot zSiO_2$$

wherein the relative amounts of oxide components of the pigment are within the ranges of $0.05 \leq x/z \leq 1.5$ and $0.1 \leq y/z \leq 2.0$.

2. The pigment-attached, blue emitting phosphor according to claim 1, wherein the blue-emitting phosphor is at least one silver-activated zinc sulfide phosphor, $Y_2SiO_5:Ce$, $Ca_2B_5O_9Cl:Eu$, $(Ba_xMg_{1-x})O \cdot nAl_2O_3:Eu$ ($0 \leq x \leq 1$, $7 \leq n \leq 8$), $SrSi_3O_8Cl_4Eu$, $CaWO_4$, $CaWO_4:Pb$, $BaFCl:Eu$, $Gd_2O_2S:Tb$ or $ZnS:Zn$.

3. A pigment-attached, blue-emitting phosphor according to claim 1 wherein said blue pigment is obtained by:
   adding an aqueous alkaline solution to an aqueous solution containing cobalt and zinc to co-precipitate cobalt and zinc as hydroxides,
   replacing the water of the combined solutions with an organic solvent, and adding a silicon raw material capable of depositing silicon oxide by hydrolysis thereto,
   depositing silicon oxide on the surface of the precipitated hydroxides by hydrolysis, and
   firing the resulting precipitate at a temperature of 700° to 1000° C. in air.

4. A pigment-attached, blue-emitting phosphor according to claim 1 wherein said blue pigment is obtained by:
   adding to an aqueous solution containing cobalt and zinc, an organic compound, as a precipitating agent, which is capable of being dissolved in water and reacting with cobalt and zinc to form a hardly water-soluble or water-insoluble material, thereby co-precipitating cobalt and zinc,
   drying the precipitated material obtained,
   mixing the dried material with silicon oxide, and
   firing the obtained mixture at a temperature of 800°–1100° C. in air.

5. The pigment-attached blue-emitting phosphor according to claim 1, wherein the pigment has an average particle size of not more than 0.5 micron.

6. A color cathode-ray tube, comprising:
   a face plate having, on the inner surface thereof, a blue-emitting fluorescent layer, a red-emitting fluorescent layer and a green-emitting fluorescent layer, said blue-emitting fluorescent layer containing the pigment-attached, blue-emitting phosphor of claim 1.

7. The color cathode-ray tube according to claim 6, wherein the blue-emitting fluorescent layer contains a silver-activated zinc sulfide phosphor, the red-emitting fluorescent layer contains a europium activated yttrium oxysulfide phosphor or a europium-activated yttrium oxide phosphor, and the green-emitting fluorescent layer contains a copper-and an aluminum-activated zinc sulfide phosphor.

8. The color cathode-ray tube according to claim 6, wherein the red-emitting fluorescent layer contains a red pigment of red iron oxide.

9. The color cathode-ray tube according to claim 6, wherein the green-emitting fluorescent layer contains a $TiO_2 \cdot ZnO \cdot CoO \cdot NiO$ green pigment.

10. A color cathode-ray tube, comprising a face plate having, on the inner surface thereof, a blue-emitting fluorescent layer, wherein a blue pigment layer is coated between the face plate and the blue-emitting fluorescent layer, said blue pigment having the formula:

$$xCoO \cdot yZnO \cdot zSiO_2$$

wherein the relative amounts of oxide components of the pigment are within the range of $0.05 \leq x/z \leq 1.5$ and $0.1 \leq y/z \leq 2.0$.

* * * * *